United States Patent [19]
Miller

[11] Patent Number: 5,783,739
[45] Date of Patent: Jul. 21, 1998

[54] SLED DOCKING SYSTEM

[75] Inventor: Patrick M. Miller, Alden, N.Y.

[73] Assignee: MGA Research Corporation, Akron, N.Y.

[21] Appl. No.: 704,421

[22] Filed: Aug. 20, 1996

[51] Int. Cl.⁶ .................................................. G01M 17/00
[52] U.S. Cl. ........................ 73/12.04; 73/12.07; 73/12.09
[58] Field of Search ............................... 73/11.01, 11.06, 73/12.01, 12.04, 12.05, 12.07, 12.09, 12.11; 104/35, 40, 41, 43, 44, 45, 46, 48, 99

[56] References Cited

U.S. PATENT DOCUMENTS

| | | | |
|---|---|---|---|
| 1,303,948 | 5/1919 | O'Connor | 73/11.06 |
| 3,430,481 | 3/1969 | Shinbaum et al. | 73/12.04 |
| 3,732,992 | 5/1973 | Busam | 414/267 |
| 3,757,562 | 9/1973 | Goldberg et al. | 73/12.04 |
| 3,831,708 | 8/1974 | Terry | 180/119 |
| 3,939,691 | 2/1976 | Stanev et al. | 73/12.01 |
| 4,417,639 | 11/1983 | Wegener | 180/116 |
| 5,245,929 | 9/1993 | Wertz et al. | 104/35 |
| 5,483,845 | 1/1996 | Stein et al. | 73/865.3 |
| 5,485,758 | 1/1996 | Brown et al. | 73/12.09 |
| 5,623,094 | 4/1997 | Song et al. | 73/12.07 |

*Primary Examiner*—George M. Dombroske
*Assistant Examiner*—Eric S. McCall
*Attorney, Agent, or Firm*—Brooks & Kushman

[57] ABSTRACT

A sled docking system for moving a sled carriage on or off a sled rail. The sled docking system includes a docking assembly which can carry a sled carriage. The docking assembly has a moving member which allows the docking assembly to be moved to any desired location including a location adjacent to the sled rail such that the sled carriage can be moved between the sled rail and the docking assembly.

25 Claims, 4 Drawing Sheets

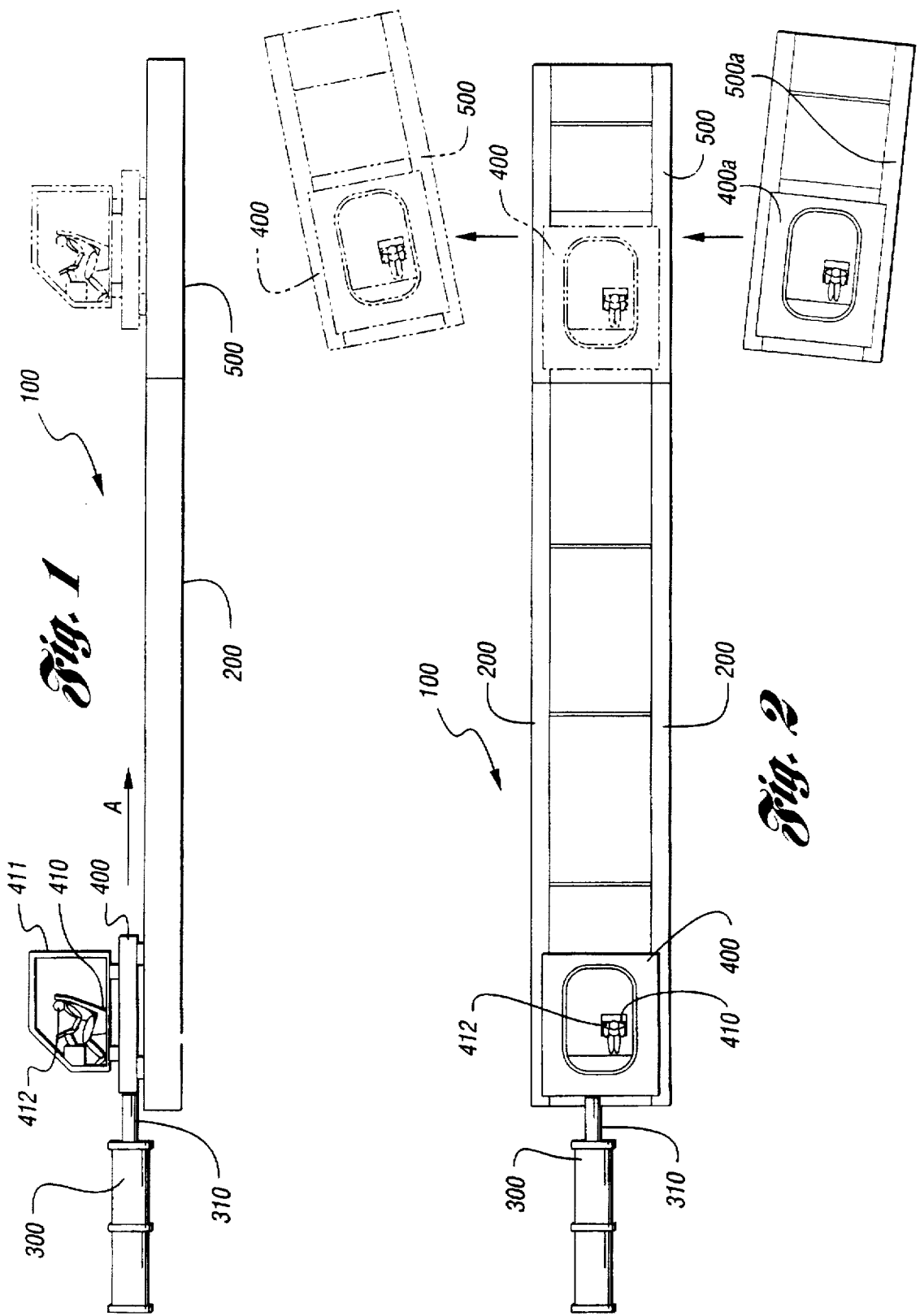

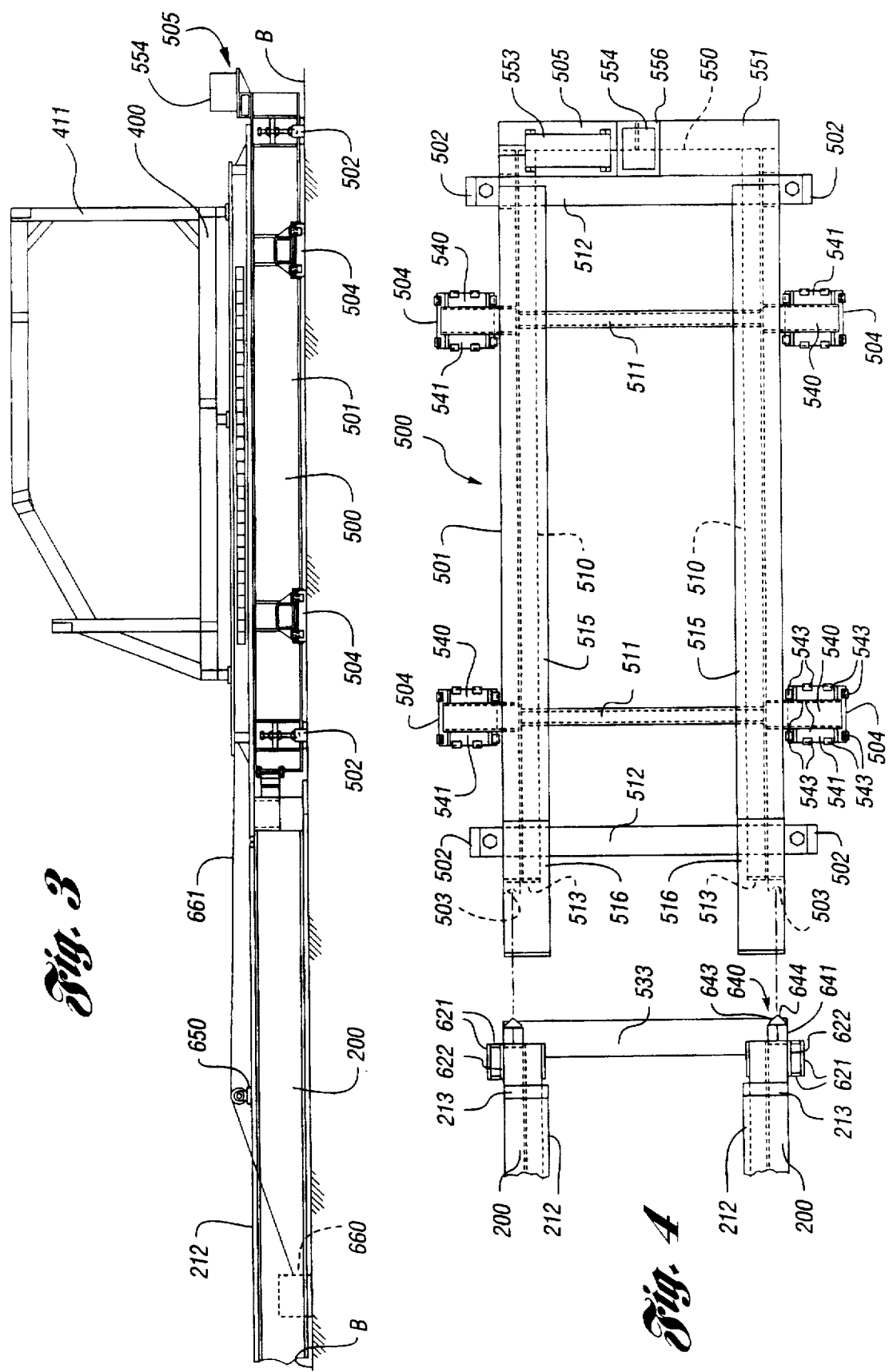

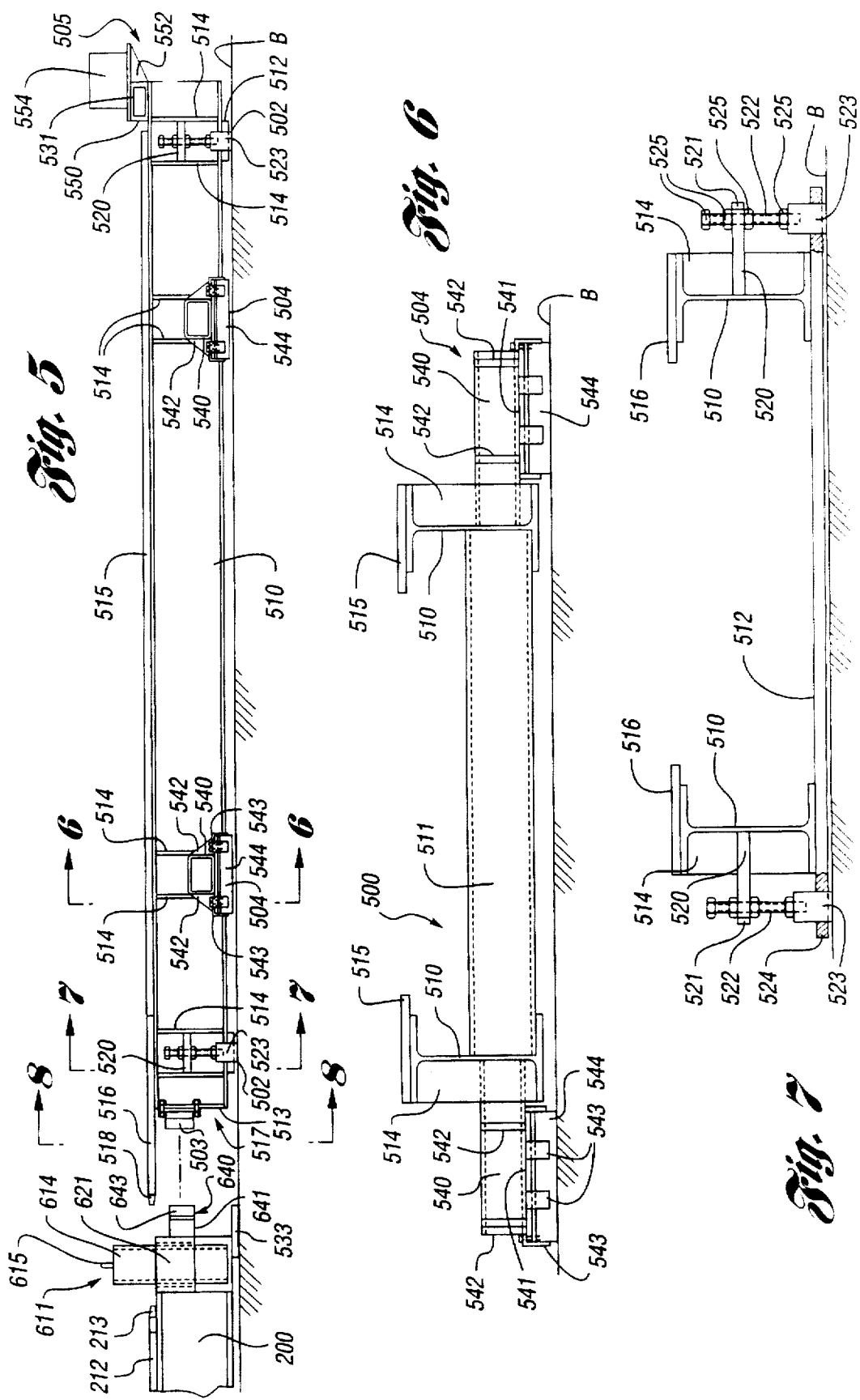

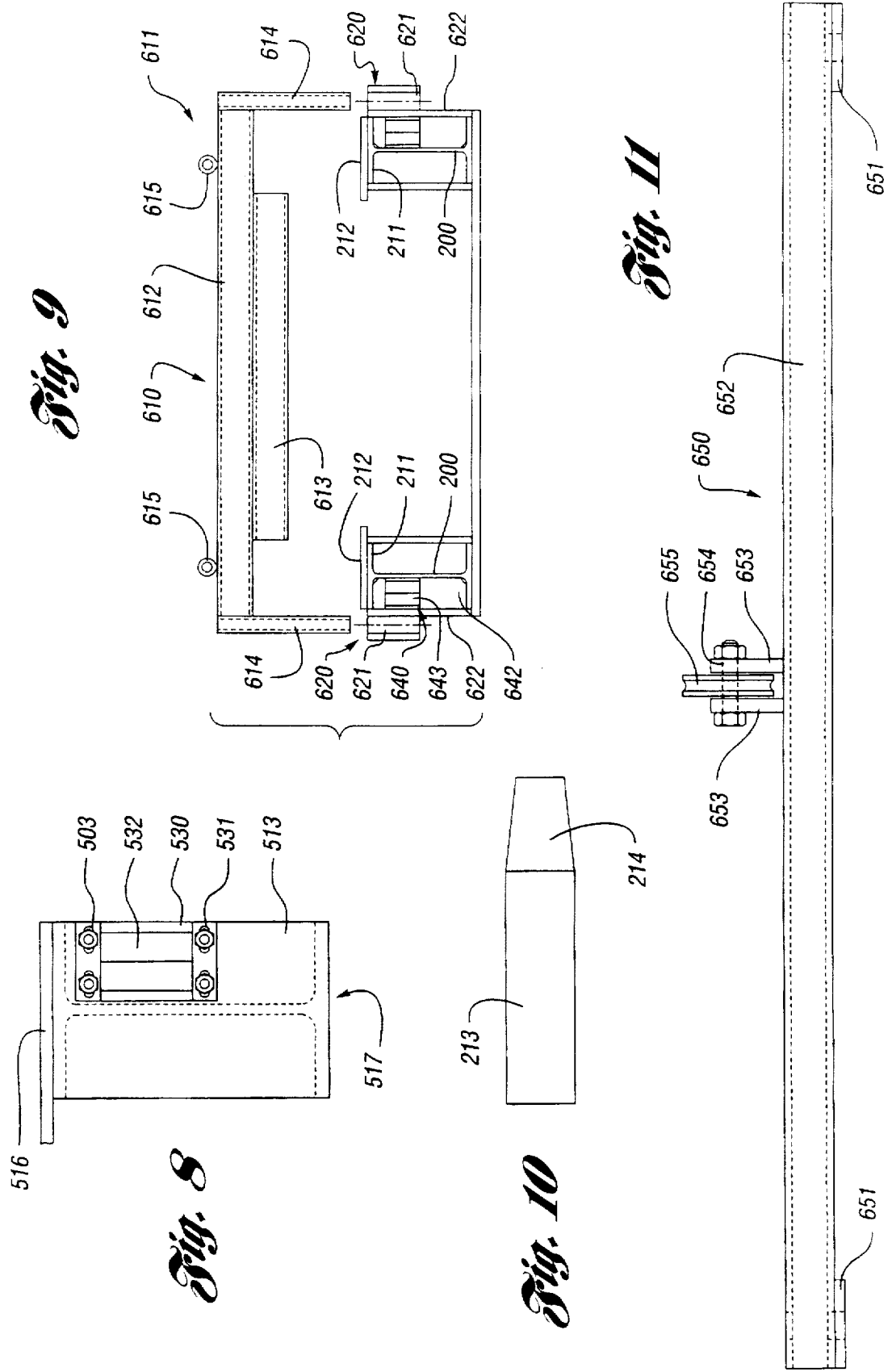

SLED DOCKING SYSTEM

TECHNICAL FIELD

This invention relates to sled testing systems for vehicular crash testing and, more particularly, to a sled docking system for changing sled carriages.

BACKGROUND ART

Vehicular crash testing is sometimes done by crashing vehicles into a barrier. Dummies are often placed within the interior of such vehicles in order to test safety equipment and determine the effect of such crashes on the occupants of the vehicle. The results of such crash testing is that the vehicles themselves are damaged.

As an alternative, sled testing systems have been developed where a portion of the vehicle, such as the interior or an interior component, may be subjected to accelerative forces similar to those which would be experienced during a crash. Like whole vehicle testing, dummies may be placed within the interior or interior components of the vehicle being tested in order to test safety equipment and determine the effect of a crash on the occupants.

Typically, the portion of the vehicle being tested, such as an interior, is mounted on a sled carriage which in turn is movably mounted onto rails. A pneumatically or hydraulically driven piston is typically employed to drive the sled carriage in an accelerative manner such that the vehicle interior or other vehicle portion is accelerated at a rate similar to that experienced during a collision.

A problem with such typical sled testing systems occurs when it is desired to switch sled carriages. In such case, the sled carriage is typically switched by detaching and lifting one sled carriage off the rails before an alternative sled carriage is lifted onto the sled rails and movably attached—a laborious process.

Another problem with such typical sled testing systems occurs when it is desired to test different components. In such case, existing test components mounted onto the sled carriage must be removed from the sled carriage before new components may be positioned and mounted onto the sled carriage—a likewise laborious process.

SUMMARY OF THE INVENTION

An object of the present invention is to provide an improved sled testing system which allows alternative sled carriages to be easily substituted.

In carrying out the above object, and other objects and features of the present invention, a novel sled docking system is provided. The novel sled docking system of this invention comprises a docking assembly which can carry a sled carriage. The docking assembly has a moving member which allows the docking assembly to be moved to any desired location including a location adjacent to the sled rail such that the sled carriage can be moved between the sled rail and the docking assembly.

In a preferred embodiment, the docking assembly has an assembly rail on which the sled carriage can be carried and the docking assembly has a moving member which allows the docking assembly to be moved to any desired location including a location where the assembly rail is aligned with and adjacent to the sled rail such that the sled carriage can be moved between the sled rail and the assembly rail.

In each of these embodiments, the docking assembly may mate with the sled rail such that the sled carriage can be moved between the sled rail and the docking assembly. Furthermore, the docking assembly may have an assembly docking guide and the sled rail may have a rail docking guide which together serve to guide the docking assembly into a position adjacent the sled rail such that the sled carriage can be moved between the sled rail and the docking assembly. In this latter instance, one of the assembly docking guide and rail docking guide may have a male mating member and the other one of the assembly docking guide and the rail docking guide may have a female mating member. In such case, the male mating member may be a male guide plate having a V-shaped protrusion and the female mating member may be a female guide plate having a V-groove.

In all of these embodiments, the moving member may be used to lift the docking assembly before it is moved via the moving member. In such case, the moving member may have an air bearing module.

In each of these embodiments, the sled docking system may further include an adjustable leg on which the docking assembly may rest when the moving member is not being used to move the docking assembly, the adjustable leg capable of being adjusted vertically such that the elevation of the docking assembly can be altered. In such case, the adjustable leg may include a threaded rod threadably connected to the docking assembly such that the adjustable leg may be adjusted vertically by rotating the threaded rod.

Furthermore, in all embodiments, the sled rail may have a rail tapered end and the assembly rail may have an assembly tapered end such that when the rail tapered end is adjacent to the assembly tapered end when the assembly rail is aligned with and adjacent to the sled rail the rail tapered end and the assembly tapered end act together to smooth the transition between the assembly rail and the sled rail.

The advantages accruing to the present invention are numerous. For example, instead of having to detach and lift alternative sled carriages off from and onto the rails, one sled carriage may be moved off the sled rail onto a docking assembly before the docking assembly is then moved to a different location. A second docking assembly carrying an alternative sled carriage may then be positioned such that the alternative sled carriage may be moved off the sled carriage onto the rail.

Another similar advantage is that if it is desired to test different components or utilize various carrier frames, it is not necessary to remove the test components or carrier frames from one sled carriage before replacing them with alternatives before testing may be resumed. Instead, one sled carriage carrying one set of test components or carrier frames may be replaced by an alternative sled carriage carrying different test components or carrier frames via two or more docking assemblies as already set forth.

Furthermore, this invention is advantageous because more time and effort is typically spent in preparing and placing onto the sled carriage the carrier frame together with associated test components for testing than in conducting the actual tests themselves. This invention allows the use of any number of sled carriages carried on any number of docking assemblies such that any number of sled carriages may be in the process of being prepared for testing while one is actually being used for testing.

Further objects and advantages of this invention will be apparent from the following description, reference being had to the accompanying drawings wherein a preferred embodiment of the present invention is clearly shown.

BRIEF DESCRIPTION OF THE DRAWINGS

While an embodiment of the invention is illustrated, the particular embodiment shown should not be construed to limit the claims. It is anticipated that various changes and modifications may be made without departing from the scope of this invention.

FIG. 1 is a schematic elevation showing an embodiment of the sled docking system of this invention;

FIG. 2 is a schematic plan showing an embodiment of the sled testing system of this invention;

FIG. 3 is a side elevation view showing one embodiment of the sled docking system of this invention;

FIG. 4 is a plan view showing one embodiment of the sled docking system of this invention;

FIG. 5 is a side elevation view similar to FIG. 3 except that the docking sled is not carrying a sled carriage and is disengaged from the rails;

FIG. 6 is a section taken along line 6—6 of FIG. 5;

FIG. 7 is a section taken alone line 7—7 of FIG. 5;

FIG. 8 is a section taken along line 8—8 of FIG. 5;

FIG. 9 is an end view of the rails showing the sled barrier detached;

FIG. 10 is a detail of the docking rail extension; and

FIG. 11 is a detail of the sled transfer winch pulley.

BEST MODE FOR CARRYING OUT THE INVENTION

A schematic of one embodiment of the sled docking system 100 of the invention is shown in FIGS. 1 and 2. The sled docking system 100 includes rails 200, a driving component 300, a sled carriage 400, and a docking assembly 500.

In the embodiment shown, the sled carriage 400 is movably mounted on rails 200. As shown in FIG. 9, the rails 200 may be formed from steel I-beams having a top flange 211 to which is attached a rail plate 212. While not shown, the rails may alternately be formed from concrete having a rectangular cross-section and having a steel rail plate on top. No matter what alternative is used, such rails are well known in the art and will not be described in further detail here.

In any event, the sled carriage 400 is typically mounted so as to move along the rail plate 212. Rollers, sliding members, or any other suitable arrangement may be used which allows the sled carriage 400 to move along the rail plate 212 relative to the rails 200.

Such sled carriages 400 also typically include an engagement assembly which engages the rails 200 to prevent dislodgment. Such an engagement assembly may include angle members (not shown) which may be removably attached to the sled carriage 400 so as to slidably engage the top flange or rail plate of the rails 200. Such sled carriages 400 and engagement assemblies are well known in the art and will not be described in further detail here.

Some portion of a vehicle desired to be tested, such as an interior 410, may be mounted onto a carrier frame 411 which is mounted in turn onto the sled carriage 400. Additionally, one or more dummies 412 may be situated in or on the interior 410 so as to test the effect of simulated crash acceleration on vehicle occupants and any protection offered to such occupants by any safety components. Such interiors 410 or interior components, such carrier frames 411, and such dummies 412, are well known in the art and will not be described in further detail here.

In operation, the sled carriage 400 carrying an interior 410 or any other component desired to be tested, is acceleratingly driven by the driving component 300. The driving component 300 may include a piston 310 which, when positioned in contact with the sled carriage 400 as shown in FIGS. 1 and 2, is then driven pneumatically, hydraulically, or in any other suitable manner in the direction "A" so as to accelerate the sled carriage 400 in the direction "A." Such driving members 300 are well known in the art and will not be described in greater detail here.

A summary of how the invention may be used is now described. As shown in FIGS. 1 and 2, when it is desired to change the sled carriage 400 being used, the sled carriage 400 may simply be moved off the rails 200 onto the docking assembly 500. The docking assembly 500 has moving members 504 (not shown in these figures) by which the docking assembly 500 may be moved along the floor surface to a different location. As best seen in FIG. 2, the docking assembly 500 may be moved out of position and an alternative docking assembly 500a carrying a different sled carriage 400a may then be moved into an appropriate position such that the new docking assembly 500a mates with the rails 200. The alternative sled carriage 400a may then be moved off the docking assembly 500a onto the rails 200 and used for testing as desired.

FIGS. 3-11 show a more detailed representation of a sled docking system 100 designed to operate similar to the embodiment shown in FIGS. 1 and 2. Unless noted otherwise, all components of this system may be made from any suitable grade of steel. As can be seen in FIGS. 3-7, the docking assembly 500 has a mainframe 501, adjustable legs 502, assembly docking guides 503, moving members 504, and a winch and console assembly 505.

As shown in FIGS. 4-7, the mainframe 501 in this embodiment is constructed from mainframe I-sections 510 interconnected by rectangular frame tubes 511, and base plates 512. At one end of the mainframe I-sections 510 are guide mount plates 513. Gusset plates 514 are mounted within the web area of the mainframe I-sections 510 adjacent the adjustable legs 502 and moving members 504. All of these components may be connected together in any suitable manner, such as by welding.

As best seen in FIGS. 4, 5, 6, and 7, a rail plate 515 is attached along the top flange of the mainframe I-sections 510. As shown in FIGS. 4 and 5, the rail plates 515 have a rail extension 516 at the docking end 517 of the mainframe 501. The rail extension 516 preferably has a tapered end 518 having a tapered configuration similar to that shown in FIG. 10. The rail plates 515 and rail extension 516 may be connected to the mainframe I-sections 510 in any suitable manner, such as by welding.

As best seen in FIGS. 5 and 7, the adjustable legs 502 include a leg support plate 520 mounted to gusset plates 514 and the web of the mainframe I-section 510. The leg support plate 520 may be mounted in any suitable manner, such as by welding. The leg support plate 520 has a leg bore 521 through which a fully threaded leg rod 522 is situated. Threadably connected to the bottom end of the leg rod 522 is a cylindrical leg base 523 which protrudes through a base plate bore 524 in the base plate 512. Hex nuts 525 are threadably mounted onto the leg rod 522 as shown and may be used to vertically adjust and lock the leg base 523 at a desired vertical location.

As best seen in FIGS. 4, 5, and 8, the assembly docking guides 503 in this embodiment are mounted to the guide mount plates 513. The assembly docking guides 503 include a docking assembly mating member, in this case a female mating member 530, connected to a guide base plate 531. The docking assembly mating member, in this case the female mating member 530, may be connected to the guide base plate 531 in any suitable manner, such as by welding. The female mating member 530 has a V-groove 532 on the side opposite the guide base plate 531. As shown in FIG. 8, the guide base plate 531 in this embodiment is bolted to the guide mount plate 513 via slotted bolt holes 533 in the guide mount plate 513. The slotted bolt holes 533 allow the mating member 530 to be adjusted horizontally so that the sled carriage 400 may be aligned properly with the rails 200 during use of the system as will be explained. While the guide base plate 531 is shown as being bolted to the guide mount plate 513 in this embodiment, any other suitable connection may be used.

The moving members 504 are mounted to the web of the mainframe I-sections 510 at points adjacent the rectangular frame tubes 511. As best shown in FIGS. 4, 5, and 6, the moving members 504 of this embodiment include a moving member support tube 540 mounted to both the web of the mainframe I-sections 510 and adjacent gusset plates 514. Mounted to the bottoms of the moving member support tubes 540 are support base plates 541 stiffened by support gusset plates 542. Retaining angle clips 543 are mounted along the perimeter of the support base plate 541 as shown.

Air bearing modules 544 are loosely and slidably situated within the space defined by the support base plate 541, the retaining angle clips 543, and the floor surface "B."

An air bearing module 544 believed to be suitable is the 8,000 lb. capacity model 4K12UL sold by AeroGo, Inc. located at 1170 Andover Park West, Seattle, Wash. 98188-3909.

In order to easily remove or insert the air bearing modules 544, it is preferable that at least two of the retaining angle clips 543 be removable along one side of the support base plates 541. For example, in the embodiment shown, the two outside retaining angle clips 543 have been bolted to each of the support base plates 541 in order to facilitate their removal. The remaining retaining angle clips 543 may be connected to the support base plates 541 in any suitable manner, such as by welding.

Of course, while the moving members 504 of this embodiment rely on air bearing modules for lateral movement, any other device, such as wheels or rollers, could be employed. Furthermore, while the moving members 504 of this embodiment rely on air bearing modules for vertical lift, any other device, such as pneumatically or motor driven lifts, could be employed.

The winch and console assembly 505 includes a winch and console base tube 550 running between and connected to the top of the rectangular frame tubes 511. Mounted to the top of the base tube 550 is a winching console base plate 551 reinforced by a gusset 552. All these components may be connected together in suitable manner, such as by welding.

As shown in FIG. 4, an air bearing module control console 553 may be mounted atop the winch and console base plate 551. Control console 553 is operatively connected to each of the air bearing modules 544 such that a user may activate the air bearing modules 544. Pressurized air may be supplied to the air bearing modules 544 from the same pressurized air source, such as a compressor, used to drive the hydraulically driven driving component 300. Hoses (not shown) may be used to transfer the pressurized air from the pressurized air source (not shown) to the control console 553 before being distributed to the air bearing modules 544 through additional hoses (not shown) which form part of the docking assembly 500. Such pressurized air sources and hoses are well known in the art and will not be discussed in further detail here.

As shown in FIGS. 3 and 4, an electric winch 554 having cable 555 (not shown) and a winch base plate 556 may also be mounted to the winch and console base plate 551. A suitable electric winch 554 would be model #4Z327 sold by W. W. Grainger, Inc., 333 Knightsbridge Parkway, Lincolnshire, Ill. 60039-3639.

The rails 200 must include modifications to properly mate and be usable with the docking assembly 500. For example, as shown in FIGS. 3, 4, 5, and 9, the rails 200 should include a rail honeycomb barrier 610, rail docking guides 640, a sled transfer winch pulley 650, and a winch 660.

The rail honeycomb barrier 610 includes a barrier removable portion 611 and a barrier mounted portion 620. The barrier removable portion 611 includes a honeycomb barrier top tube 612 joined to a honeycomb barrier bottom tube 613. The top tube 612 is connected to two vertical honeycomb barrier side tubes 614. These members may be connected together in any suitable manner, such as by welding. Connected to the top of the top tube 612 are eye bolts 615 to ease handling of the barrier removable portion 611.

The barrier mounted portion 620 includes three barrier support plates 621 mounted to a side support plate 622 which is connected to the flanges of the rail 200. The barrier support plates 621 are assembled onto the side support plates 622 so as to form a rectangular tube within which the honeycomb barrier side tubes 614 may be slidably mounted.

As best seen in FIGS. 4, 5 and 9, the rail docking guide 640 includes two docking guide extensions 641, such as tubes, mounted onto the side of gussets 642 spanning between the rail flanges at the end of the rails 200. A rail mating member 643 is mounted onto the two docking guide extensions 641. In this embodiment, the rail mating member 643 is a male mating member made from a guide plate having a V-shaped protrusion 644 dimensioned so as to be able to mate with the V-groove 532 of the female mating member 530 of the docking assembly 500.

As best seen in FIGS. 4, 5, and 9, the rails 200 are tied together below the rail docking guides 640 via a tie plate 533 connected to the bottom flange of the rails 200 and protruding from the ends of the rails 200, a distance identical to the protrusion of the rail docking guides 640. The tie plate 533 may be connected to the rails 200 in any suitable manner, such as by welding.

Modification of the rails 200 also preferably includes a modification of the ends of the rails 200. As shown in FIGS. 4, 5, and 10, the rail plates 212 mounted on top of the rails 200 preferably include a rail extension plate 213 having a tapered end portion 214.

As shown in FIGS. 3 and 11, during operations when an alternative sled carriage 400 is being brought onto the rails 200, a sled transfer winch pulley 650 may be removably mounted to the rail plates 212 of the rails 200. In the embodiment shown in FIG. 3, the sled transfer winch pulley 650 has been mounted to the rail plates 212 by way of bolts and nuts. However, any suitable connection could be used.

As best seen in FIG. 11, the sled transfer winch pulley 650 includes pulley base plates 651 mounted onto a pulley tube 652. Mounted atop the pulley tube 652 are two pulley devises 653 having clevis bores 654. A suitable pulley 655 is then mounted between the pulley devises 653 via any suitable connection, such as a suitable bolt and nut combination. A pulley 655 believed to be suitable is the model #3168T15 sold by McMaster & Carr, P.O. Box 440, New Brunswick, N.J. 08903-0440.

As shown in FIG. 3, as part of this sled docking system 100, a winch 660 together with suitable cable 661 is preferably mounted between the rails 200 and is to be used in conjunction with the pulley 650. While any suitable winch 660 may be used, the model #4Z327 electric winch sold by W. W. Grainger, Inc., is believed to be suitable.

As shown in this embodiment, the sled docking system 100 may be used as follows. When it is desired to remove a sled carriage 400 from the rails 200, and using FIGS. 1, 2, and 3 as the main references, the barrier removable portion 611 is removed from the barrier mounted portion 620 by sliding the honeycomb barrier side tubes 614 out from the rectangular tube formed by the barrier support place 621 and side support plate 622.

Using FIGS. 1, 2, 3, 4, and 5 as an overall frame of reference, the docking assembly 500 is then moved into position via the moving members 504. In the embodiment shown, this is done by operating the air bearing module control console 553 so as to feed pressurized air into the air bearing modules 554. As a result, the docking assembly 500 is raised slightly off the ground and it may be easily moved along the floor surface "B" to a different location on a "bed of air." In this case, the docking assembly 500 is moved such that assembly docking guides 503 of the docking assembly 500 mate with the rail docking guides 640. In other words, in the embodiment shown, the V-shaped protrusion 644 of the rail mating member 643 should mate with the V-groove 532 of the docking assembly mating member 530.

The air bearing modules 544 are then deactivated so that the adjustable legs 502 of the docking assembly 500 will come to rest on the floor surface "B." At this point in time, the tapered end portion 214 of the rail extension plate 213 of the rails 200 will be adjacent to the tapered end 518 of the rail extension 516 of the docking assembly 500. The top of the rail extension plate 516 will also be slightly above or flush with the top of the rail extension plate 213 of the rails 200. The adjustable legs 502 may then be adjusted vertically via the threaded leg rod 522 and hex nuts 526 to account for any variations in the floor surface "B" and to ensure that the rail extension 516 of the docking assembly 500 and the rail extension plate 213 of the rails 200 are at similar elevations.

The tapered end 518 of the rail extension 516 and the tapered end portion 214 of the rail extension plate 213 serve to provide a transition between the rail extension 516 and the rail extension plate 213 in the event the rail extension 516 and the rail extension plate 213 are at slightly different elevations. As a result, the sled carriage 400 can be moved between the rail extension 516 and the rail extension plate 213 without any interferences which could otherwise be caused by an abrupt elevational difference.

The winch cable 555 of the electric winch 554 may then be hooked up in any suitable manner to the sled carriage 400. The electric winch 554 may then be operated so as to move the sled carriage 400 from the rails 200 onto the docking assembly 500 as shown in FIG. 3. The air bearing modules 554 may then be activated once again in order to remove the docking assembly 500 together with the sled carriage 400 to a different location.

As shown in FIG. 2, a second docking assembly 500a carrying an alternative sled carriage 400a may then be similarly moved into position by operating air bearing modules 544 and mating the docking assembly 500 to the rails 200 as previously described. The sled transfer winch pulley 250 may then be bolted onto the top of the rail plates 212 as shown in FIG. 3. The winch cable 661 of the winch 660 may then be run over the sled transfer winch pulley 250 and hooked onto the alternative sled carriage 400a in any suitable manner. The winch 260 may then be operated in order to move the new sled carriage 400a onto the rails 200.

After the new sled carriage 400a has been moved onto the rails 200, the barrier removable portion 611 of the rail honeycomb barrier 610 may be replaced. The sled testing system is then ready for operation with the new sled carriage 400a. The purpose of the rail honeycomb barrier 610 is to provide for emergency stopping of the sled carriage 400a in the event it cannot be braked properly during testing operations.

The sled docking system of this invention, an example of which is illustrated by the sled docking system 100 as shown, greatly eases the use of alternative sled carriages. Instead of having to detach and lift alternative sled carriages off from and onto the rails 200, they are simply moved off from or onto the docking assembly 500 as described.

Another advantage to this invention is that if it is desired to test different components, it is not necessary to remove test components from one sled carriage, and replace those components with alternative components, before testing may be resumed. Instead, an alternative sled carriage carrying different components to be tested may simply be alternated in place of a previous sled carriage carrying different components as described.

Furthermore, more time and effort is typically spent in preparing the carrier frame together with any associated components for testing than conducting the actual tests themselves. Accordingly, this invention allows the use of any number of sled carriages such that any number may be in the process of being prepared for testing while one is actually be used for testing.

While a particular embodiment of the invention has been illustrated described, it will be obvious to those skilled in the art that various changes and modifications may be made without departing from this invention. It is intended that the following claims cover all such modifications and all equivalents that follow from the true spirit and scope of this invention.

What is claimed Is:

1. A sled docking system for moving a sled carriage on or off a sled rail and along a ground surface, the sled docking system comprising:

a docking assembly for carrying a sled carriage, the docking assembly having a moving member which allows the docking assembly to be moved to any desired location in any direction along the ground surface including a location adjacent to the sled rail such that the sled carriage is movable between the sled rail and the docking assembly.

2. The sled docking system of claim 1 wherein the docking assembly mates with the sled rail such that the sled carriage is movable between the sled rail and the docking assembly.

3. The sled docking system of claim 1 wherein the docking assembly has an assembly docking guide and the sled rail has a rail docking guide which together serve to guide the docking assembly into a position adjacent the sled rail such that the sled carriage is movable between the sled rail and the docking assembly.

4. The sled docking system of claim 3 wherein one of the assembly docking guide and the rail docking guide has a male mating member and the other one of the assembly docking guide and rail docking guide has a female mating member.

5. The sled docking system of claim 4 wherein the male mating member has a V-shaped protrusion and the female mating member has a V-groove.

6. The sled docking system of claim 1 wherein the moving member is usable to lift the docking assembly before the docking assembly is moved via the moving member.

7. The sled docking system of claim 6 wherein the moving member has an air bearing module.

8. The sled docking system of claim 1 further including an adjustable leg on which the docking assembly is restable when the moving member is not being used to move the docking assembly, the adjustable leg capable of being adjusted vertically such that the elevation of the docking assembly is alterable.

9. A sled docking system for moving a sled carriage on or off a sled rail and along a ground surface, the sled docking system comprising:

a docking assembly having an assembly rail on which a sled carriage is carryable, the docking assembly having a moving member which allows the docking assembly to be moved to any desired location in any direction along the ground surface including a location where the assembly rail is aligned with and adjacent to the sled rail such that the sled carriage is movable between the sled rail and the assembly rail.

10. The sled docking system of claim 9 wherein the docking assembly mates with the sled rail such that the assembly rail is aligned with and adjacent to the sled rail such that the sled carriage is movable between the sled rail and assembly rail.

11. The sled docking system of claim 9 wherein the docking assembly has an assembly docking guide and the sled rail has a rail docking guide which together serve to guide the docking assembly into a position adjacent the sled rail such that the assembly rail is aligned with and adjacent to the sled rail.

12. The sled docking system of claim 11 wherein one of the assembly docking guide and the rail docking guide has a male mating member and the other one of the assembly docking guide and the rail docking guide has a female mating member, the male mating member and female mating member together serving to guide the docking assembly into proper position adjacent the sled rail such that the assembly rail is aligned with and adjacent to the sled rail such that the sled carriage is movable between the sled rail and the assembly rail.

13. The sled docking system of claim 12 wherein the male mating member has a V-shaped protrusion and the female mating member has a V-groove.

14. The sled docking system of claim 9 wherein a moving member is usable to lift the docking assembly before the docking member is moved via a moving member.

15. The sled docking system of claim 14 wherein the moving member includes an air bearing module.

16. The sled docking system of claim 9 further including an adjustable leg on which the docking assembly is restable when the moving member is not being used to move the docking assembly, the adjustable leg capable of being adjusted vertically such that the elevation of the docking assembly is alterable.

17. The sled docking system of claim 15 wherein the adjustable leg includes a threaded rod threadably connected to the docking assembly such that the adjustable leg is adjustable vertically by rotating the threaded rod.

18. The sled docking system of claim 9 wherein the sled rail has a rail tapered end and the assembly rail has an assembly tapered end, the rail tapered end being adjacent to the assembly tapered end when the assembly rail is aligned with and adjacent to the sled rail, the rail tapered end and assembly tapered end acting together to smooth the transition between the assembly rail and the sled rail.

19. A sled docking system for moving a sled carriage on or off a sled rail and along a ground surface, the sled rail having a rail docking guide, the sled docking system comprising:

a docking assembly having an assembly rail on which a sled carriage is carryable, the docking assembly having an assembly docking guide, the docking assembly having a moving member which is usable to lift the docking assembly such that docking assembly is movable via the moving member to any desired location in any direction along the ground surface including a location where the assembly docking guide and rail docking guide together guide the docking assembly into a position where the assembly rail is aligned with and adjacent to the sled rail such that the sled carriage is movable between the sled rail and the assembly rail.

20. The sled docking system of claim 19 wherein the moving member has an air bearing module which is usable to lift the docking assembly before the moving member is moved via the air bearing module.

21. The sled docking system of claim 19 further including an adjustable leg on which the docking assembly is restable when the moving member is not being used to move the docking assembly, the adjustable leg capable of being adjusted vertically such that the elevation of the docking assembly is alterable.

22. A sled docking system for moving a sled carriage on a sled rail or off a sled rail and along a ground surface, the sled docking system comprising:

a docking assembly for carrying a sled carriage, the docking assembly having a moving member including an air bearing module which allows the docking assembly to be moved to any desired location in any direction along the ground surface including a location adjacent to the sled rail such that the sled carriage is movable between the sled rail and the docking assembly.

23. The sled docking system of claim 22 further including an adjustable leg on which the docking assembly is restable when the moving member including the air bearing module is not being used to move the docking assembly, the adjustable leg capable of being adjusted vertically such that the elevation of the docking assembly is alterable.

24. The sled docking system of claim 23 wherein the moving member includes a module space within which the air bearing module is retained so as to be movable in a substantially vertical direction.

25. The sled docking system of claim 24 wherein the docking assembly mates with the sled rail such that the sled carriage is movable between the sled rail and the docking assembly.

* * * * *